(12) United States Patent
Cordara et al.

(10) Patent No.: US 9,013,487 B2
(45) Date of Patent: Apr. 21, 2015

(54) METHOD FOR THE CALCULATION OF THE BOUNDING BOX OF VECTORIAL GRAPHIC SHAPES

(75) Inventors: Giovanni Cordara, Turin (IT); Gianluca Francini, Turin (IT); Diego Gibellino, Turin (IT); Andrea Varesio, Turin (IT)

(73) Assignee: Telecom Italia S.p.A., Milan (IT)

( * ) Notice: Subject to any disclaimer, the term of this patent is extended or adjusted under 35 U.S.C. 154(b) by 319 days.

(21) Appl. No.: 13/520,140

(22) PCT Filed: Dec. 30, 2009

(86) PCT No.: PCT/IT2009/000595
§ 371 (c)(1),
(2), (4) Date: Jun. 29, 2012

(87) PCT Pub. No.: WO2011/080776
PCT Pub. Date: Jul. 7, 2011

(65) Prior Publication Data
US 2012/0299932 A1    Nov. 29, 2012

(51) Int. Cl.
*G06T 11/20*    (2006.01)
(52) U.S. Cl.
CPC .................................. *G06T 11/203* (2013.01)
(58) Field of Classification Search
CPC .................................................... G06T 11/203
USPC ........................................................ 345/442
See application file for complete search history.

(56) References Cited

U.S. PATENT DOCUMENTS

| | | | |
|---|---|---|---|
| 6,201,549 B1* | 3/2001 | Bronskill | 345/441 |
| 6,512,847 B1* | 1/2003 | Gnutzmann | 382/173 |
| 6,784,884 B1* | 8/2004 | Hsieh | 345/421 |
| 2006/0007352 A1* | 1/2006 | Liao et al. | 348/441 |
| 2007/0016329 A1* | 1/2007 | Herr et al. | 700/250 |
| 2010/0036785 A1* | 2/2010 | Tzruya et al. | 706/45 |
| 2010/0188404 A1* | 7/2010 | Tong et al. | 345/426 |
| 2013/0127856 A1* | 5/2013 | Winnemoeller et al. | 345/423 |
| 2013/0127889 A1* | 5/2013 | Winnemoeller et al. | 345/582 |
| 2014/0160133 A1* | 6/2014 | Deming | 345/442 |

FOREIGN PATENT DOCUMENTS

| | | |
|---|---|---|
| AU | 2007202027 A1 | 11/2008 |
| GB | 2 313 028 A | 11/1997 |
| WO | 2004/100071 A1 | 11/2004 |

OTHER PUBLICATIONS

Affine and curvilinear transformation by Tim Haithcoat, 1999.*
Vector drawing, Juan Pablo De Gregorio, 2006.*
International Search Report dtd Sep. 16, 2010, PCT/IT2009/000595.
S. Conversy J.D. Fekete, "The svgl toolkit: enabling fast rendering of rich 2D graphics", Technical Report 02/1/INFO, Ecole des Mines de Nantes, 2002.

* cited by examiner

*Primary Examiner* — Javid A Amini
(74) *Attorney, Agent, or Firm* — Banner & Witcoff, Ltd.

(57) ABSTRACT

Method for determining the bounding box of a computerized graphic shape comprising one or more primitives described in vectorial mode, wherein the bounding box is calculated by applying analytical mathematical formulas to the vectorial description of the primitives constituting the shape without preliminarily performing a phase of drawing and displaying of the shape through resolution of the vectorial primitives that compose it.

21 Claims, 6 Drawing Sheets

METHOD FOR THE CALCULATION OF THE BOUNDING BOX OF VECTORIAL GRAPHIC SHAPES

CROSS REFERENCE TO RELATED APPLICATIONS

This is a U.S. National Phase Application under 35 U.S.C. §371 of International Application No. PCT/IT2009/000595, filed Dec. 30, 2009, which was published Under PCT Article 21(2), the entire contents of which are incorporated herein by reference.

TECHNOLOGICAL BACKGROUND OF THE INVENTION

1. Technical Field of the Invention

The present invention relates in general to computer graphics and to vectorial image processing. The present invention more specifically concerns a method for the calculation of the bounding box of vectorial graphic shapes, in the context of vectorial image processing; by the term "bounding box" there is intended the smallest rectangle that circumscribes a digital graphic shape when the latter is positioned on a page (for instance a Web page), or however displayed on a screen, for instance the screen of a Personal Computer, or printed on a support of paper or other material.

2. Discussion of the State of the Art

The trend in modern developments in the field of Web and graphic interfaces is toward solutions of the declaratory type. The application software is written using more and more complex semantics and at a high level, so as to facilitate and to accelerate the project and implementation tasks. This is made possible thanks to the availability of engines for the interpretation of high-level and more and more sophisticated and complex languages. Many of these engines have been developed in the field of the Web, because the HTML (Hyper-Text Markup Language) paradigm is the most common for the development of complex software applications. There are several examples of this type of engines. The Web browsers themselves, normally exploited by the users for the navigation in the World Wide Web, are interpreters of the HTML syntax (or of evolutions thereof), which is a specialization of the XML (eXtensible Markup Language) syntax. The Flash technology is another example, not limited to the graphic aspects, but also with functionality of application intelligence. XAML (eXtensible Application Markup Language) and XUL (XML User interface Language) by Microsoft and Mozilla, respectively, are other examples of engines that associate application logics to the creation of Graphical User Interfaces (GUI) through scripting languages capable of extending the functionalities, for instance allowing queries on remote databases, access to Web services or use of the network interfaces.

At the base of all these solutions there is a bidimensional (2D) vectorial graphic interpretation engine, capable of interpreting a syntax of the XML type transforming it into graphic primitives compliant with the used rendering libraries (in the field of computer graphics, the term "rendering" identifies the process of render, i.e. of generation of an image starting from a description thereof, for instance a mathematical description, provided in a determined language and interpreted by the graphic engine).

As known in the field, the vectorial modality provides for a generic digital graphic shape to be represented through one or more primitive graphic shapes (primitive curves), like for instance segments, circles etc. Every primitive curve is described through a respective mathematical equation on the base of parameters (so-called "control points") apt to univocally identify it.

The vectorial representation modality of graphic shapes is advantageous since it operates with continuous functions and allows a total control of the primitives, and therefore of the graphic shapes to be represented. Particularly, by modifying the number and the position of the control points of the primitives it is possible to trace almost any graphic shape. Additionally, the vectorial representation modality occupies less memory resources compared to other representation modalities (like for instance the raster modality), and also the amount of data to be transferred (for instance through a network connection) is limited.

The graphic interpretation engines, particularly those of vectorial type, have the purpose of providing to the programmer high-level semantic constructions for the development of sophisticated graphic interfaces. The offered functionalities can be summarized in the following macrofamilies:

bidimensional shapes: elementary geometric images (primitives) are foreseen, like circles, rectangles with rounded edges, ellipsis, lines, polygons and polygonal lines (non-closed broken lines). Additionally, complex images are foreseen, known as "paths", that are described as sets of elementary geometric images, with the addition of Bezier curves, with the purpose of allowing the greatest possible graphic flexibility. The concept of transformation is associated with the primitives, which in the 2D case is an affine 2D transformation;

"fill & stroke": by this terms there are intended graphic primitives displayed using separate concepts of contour and filling. These constructions have vectorial characteristics different from each other: the contour is characterized by thickness, hatch, modes of junction and termination; the filling has instead associated therewith the concept of mode of filling (this is meaningful in particular for non-convex images). However, these constructions also have vectorial characteristics in common, known as "paint servers", that identify the color by which the shape, that corresponds to the semantic construction, is drawn. The color can have simple characteristics, as in the case of solid color, or complex characteristics, as in the case of linear or radial color gradients. In this last case, the gradients are described by a vector that describes the direction of variation of the color, and by a list of "stop colors" that describes the trend of the colors in the form of a broken curve where the interpolation between two adjacent stop colors is linear.

video, images and audio: an important semantic functionality is the ability to insert and to check multimedia contents inside the displayed graphic scene;

animations: these are semantic constructions for modifying in a predetermined way the temporal evolution of the properties of the primitives;

interaction: the graphic engine is able to manage user events (like for instance movements of the mouse, clicks, inputs of keyboard commands) and to trigger the start, the end or in general to modify the temporal evolution of animations;

script and DOM (Document Object Model): the constructions described above, even being very powerful, cannot cover the whole range of possible functionalities needed by an author. The ability to describe through a program non-predefined behaviors is made possible by the ability of the graphic engine to execute interpreted high-level code, like Java or Javascript. The possibility to use interpreted code involves the availability of an API (Application Programming Interface) that the code can invoke for accessing in reading and writing the semantic information of the primitives. In order to be able to enter and update by means of a program the content of such information, the so-called DOM is generally used, which is a mode of representation of the documents structured as an object-oriented model.

The dominant feature is the vectoriality: all the graphic primitives and the contour constructions (animations, interaction, scripting) are always described and used in vectorial mode.

There are many examples of standardized or proprietary engines that offer semantic functionalities referable to those described above; one of these is the Scalable Vector Graphics (SVG) engine of the W3C (World Wide Web Consortium).

In general, a vectorial graphic engine receives a description of a vectorial graphic scene to be drawn. The graphic scene is normally described in XML and it is composed by a hierarchy of nodes (father and children) represented by a tree of inheritance. The nodes can be "container" type nodes, that is, they are not susceptible of a graphic representation but act as containers of other nodes, or the nodes can be shapes or graphic primitives, that is, they do have a graphic representation.

A problem of significant complexity is the calculation of the bounding box of a graphic primitive. This functionality is essential for the following reasons:

use by the interpreted script code: in order to be able to manipulate the properties of complex primitives, or of groups of complex primitives, the calculation of the bounding box needs to be made available on the API of the DOM, that allows the author to check the encumbrance of the complex and composed primitives;

vectorial features expressed in relative way: the gradients of the vectors can for instance be represented in the system of coordinates of the complex primitive (instead of being represented in the user reference system used by the primitive that exploits it, or even in document coordinates);

manipulation of the graphic objects through visual editing tools of the WYSIWYG (What You See Is What You Get) type: the movement, the rotation, the scaling of the dimensions of the graphic primitive inside the scene through visual paradigms using pointing tools like a mouse and a keyboard usually exploit the concept of bounding box drawn around to the primitive(s) selected by the user at a given time.

The bounding box, also known in literature as "Minimum Bounding Rectangle" (MBR), has the followings features:

it has to be calculated as the smallest rectangle that contains the complex image without intersecting it;

it shall not take into account the transformations that the complex image receives in inheritance from the primitives that contain it. This is due to the strongly hierarchical semantics of SVG. A primitive can be contained by other elements (fathers). The propagation of the node properties from the father node to the child node follows different rules depending on the properties: in the case of affine transformations, the applied rule is the accumulation.

The bounding box information is not strictly linked to the current drawing of the scene. Particularly, the necessity of providing the bounding box information also to the script code that is executed inside the scene foresees that the calculation of the bounding box might be requested also in respect of primitives that are not subsequently visible, which are not in the drawing branch of the tree that describes the scene, or that have a series of inherited parameters that do not follow the inheritance rules of the tree. For instance, it may be necessary to have the bounding box of a group of primitives taking into account the transformation inherited from their fathers. This means having available the encumbrance of the complex primitive before every transformation that projects it into the general scene. Another example that shows how it may be possible to require the calculation of the bounding box for composed primitives that are not visible is the case of the creation of a description branch of the scene through a program (through a script code): in this case the code can create a branch of description of the scene and it may require the bounding box thereof before this is inserted in the main tree.

From a functional point of view, the task of calculating the bounding box of a complex primitive is to be associated with the part of the graphic engine that manages the drawing, that is, that phase that transforms the information present in the tree description of the scene into bidimensional drawing, graphic primitives.

In modern rendering techniques, due to the increasing complexity of the scenes to be drawn, the hardware acceleration made possible by the graphic processors (for instance, Graphic Processing Unit—GPU) is exploited. Machines devoted to the management of the graphics are fed with series of primitives in a complex processing chain (a pipeline). Many types of processing pipelines exist, the most common being those used in three-dimensional videogames through APIs known as Direct3D (Microsoft) and OpenGL (Linux etc.). In general, the rendering process is under the control of a processing unit different from the main CPU, or however under the control of a processing task different from that managing the remaining of the application.

In general, as for instance described in S. Conversy J. D. Fekete, "The svgl toolkit: enabling fast rendering of rich 2D graphics", Technical Report 02/1/INFO, Ecole des Mines de Nantes, 2002, in order to be able to require to the renderer (the hardware processing unit or the firmware or software task that performs the operations necessary for the rendering) to calculate the bounding box, it is necessary to send thereto the list of the primitives and the related properties, and then wait for the renderer task to take over the information, and feed the draw processing pipeline; the processing pipeline shall thereafter execute all the operations waiting in the queue and eventually it provides the result. Particularly, for calculating the bounding box the renderer simulates the process of rendering of the branch of tree inside which there is the primitive, as if the renderer should display the graphic shape described by the primitive, even if the display on the screen of the primitive is not necessary.

Since, normally, the processing pipelines are exclusively able to draw pixels and not primitives expressed in vectorial way, it is necessary (through software or using hardware functionalities provided for in the pipeline) to decompose the vectorial primitive in simple linear primitives (for example lines or triangles) compatible with the way of operation of the pipeline; this operation is known as tessellation. After the tessellation, the calculation of the bounding box is relatively simple, since it is a by-product of the tessellation operation results (consisting in the identification of the minimum and of the maximum—in the selected system of coordinates—among all the generated vertexes).

U.S. Pat. No. 6,512,847 shows a technique for the calculation of a frame around a Bezier curve. The frame corresponds to a Bezier curve that approximates the trend of the original Bezier curve spaced apart of an arbitrary distance. In this case, an approximation is employed that eventually imposes the definition of a "mid point" inside the curve through known algorithms and the related calculation of the new "control points" decomposing the curve in sub-curves of lesser length.

WO 2004/100071 proposes a method for the analytical deformation of Bezier curves; the deformation is set through an interaction with the user keeping fixed the initial and final controls points and sectioning or joining different curves for best approximating the desired deformation. The requisite of providing curves parallel to the original one is not considered.

SUMMARY OF THE INVENTION

The Applicant has observed that the traditional techniques of calculation of the bounding box by a renderer such as a devoted graphic CPU (for instance a GPU) involve long processing time, because of the long series of operations of data transfer (primitives), change of context (the program in execution on the CPU with limited privileges—so-called "user space mode"—has to be able to access the resources of the graphic card and therefore it has to be able to execute code with high privileges, typically inside the driver in kernel mode) and wait for the execution by the renderer. These operations often involve long times, even equal to the time of displaying of some frames on the screen.

An aspect that further weights the calculation of the bounding box is the tessellation phase implemented by the draw pipeline. The operation is very onerous in terms of time, and useless under some respects, because all the operations performed during the tessellation are only aimed at calculating the minimum and maximum values of the calculated coordinates.

In view of the state of the art outlined, the Applicant has faced the problem of making the process of calculation of the bounding box less heavy from the computational point of view, and therefore also faster.

Essentially, according to the present invention, the bounding box is not calculated downstream of the phase of drawing or displaying the graphic shape, but it is directly calculated starting from the information present in the tree description of the scene, using an analytical algorithm. Thanks to this:

no phases of fictitious drawing are necessary, to be performed by the displaying system with the only purpose of allowing the calculation of the bounding box of primitives not visible or with properties already known to the renderer;

it is not necessary to perform the tessellation operation, i.e. decomposing every single primitive into a series of triangles used as basic elements of every rendering system.

All this translates into a notable saving of burden and computational time. Particularly, by relieving the computational burden, it is possible to implement the process also on devices which are not particularly powerful, not equipped with a graphic accelerator, like for instance smart-phones, that nowadays are more and more frequently used for the Web surfing.

According to an aspect of the present invention, a method is provided for determining the bounding box of a computerized graphic shape comprising one or more primitives described in vectorial mode, in which the bounding box is calculated by applying analytical mathematical formulas to the vectorial description of the primitives constituting the shape without preliminarily performing a phase of draw and display of the shape through resolution of the vectorial primitives that compose it.

The vectorial primitives can include the following elementary vectorial primitives:
an elementary vectorial primitive describing a segment of straight line, possibly with thickness, and
an elementary vectorial primitive describing a cubic Bezier curve, possibly with thickness.

The calculation of the bounding box of the elementary vectorial primitive describing a segment includes for instance the determination, in a reference system of coordinates, of the minimum and maximum coordinates of the vertexes of the segment possibly having thickness.

The calculation of the bounding box of the elementary vectorial primitive describing a cubic Bezier curve can for instance include:
calculating the points of horizontal and vertical tangency to the Bezier curve;
if such points of horizontal and vertical tangency lie on the curve, taking the coordinates, in a reference system of coordinates, of such points of tangency as the coordinates of sides of the bounding box; while
if at least one of the points of horizontal and vertical tangency does not lie on the curve, taking as coordinates of the side of the bounding box the coordinates of the extreme point of the curve closer to the point of tangency that does not lie on the curve.

In case the cubic Bezier curve has thickness, the method can include
calculate first points of vertical and horizontal tangency to the ideal cubic Bezier curve without thickness,
determining second points located on the perpendicular lines to the first points of vertical and horizontal tangency to the ideal cubic Bezier curve and at a distance from the first points corresponding to the thickness of the curve.

In case an affine transformation is applied to the cubic Bezier curve with thickness, the calculation of the bounding box can include:
determining the points of horizontal and/or vertical tangency on the cubic Bezier curve of unitary thickness obtained from the transformation of the curve of unitary thickness before the transformation;
determining the values of a curvilinear coordinate of the cubic Bezier curve of unitary thickness obtained from the transformation, said values corresponding to the points of horizontal and/or vertical tangency to the curve of unitary thickness;
calculating the coordinates of the points on the curve of unitary thickness before the transformation corresponding to the values of the curvilinear coordinate;
determining the points located on the perpendicular to the points on the ideal curve before transforming it corresponding to the values of the curvilinear coordinate, said points on the perpendicular being placed at a distance equal to the thickness of the curve; and
applying the transformation to the points so determined.

Preferably, for the calculation of the bounding box, the mode of junction between elementary primitives, and/or the mode of termination of an elementary primitive are considered.

In case the graphic shape includes more than one primitive described in vectorial mode, the bounding box is preferably performed for every primitive, and subsequently the bounding boxes of the individual primitives are combined by union.

Another aspect of the invention concerns a program for computer comprising portions of code executable by a computer adapted to allow the computer to perform the method according to the previous aspect of the invention when the program is executed by said computer.

BRIEF DESCRIPTION OF THE DRAWINGS

The features and advantages of the present invention will be made evident by the following detailed description of one embodiment thereof, provided merely by way of non-limiting example. For the better intelligibility of the description, reference to the attached drawings shall be made, in which.

DETAILED DESCRIPTION OF AN EMBODIMENT OF THE INVENTION

Figure 1:
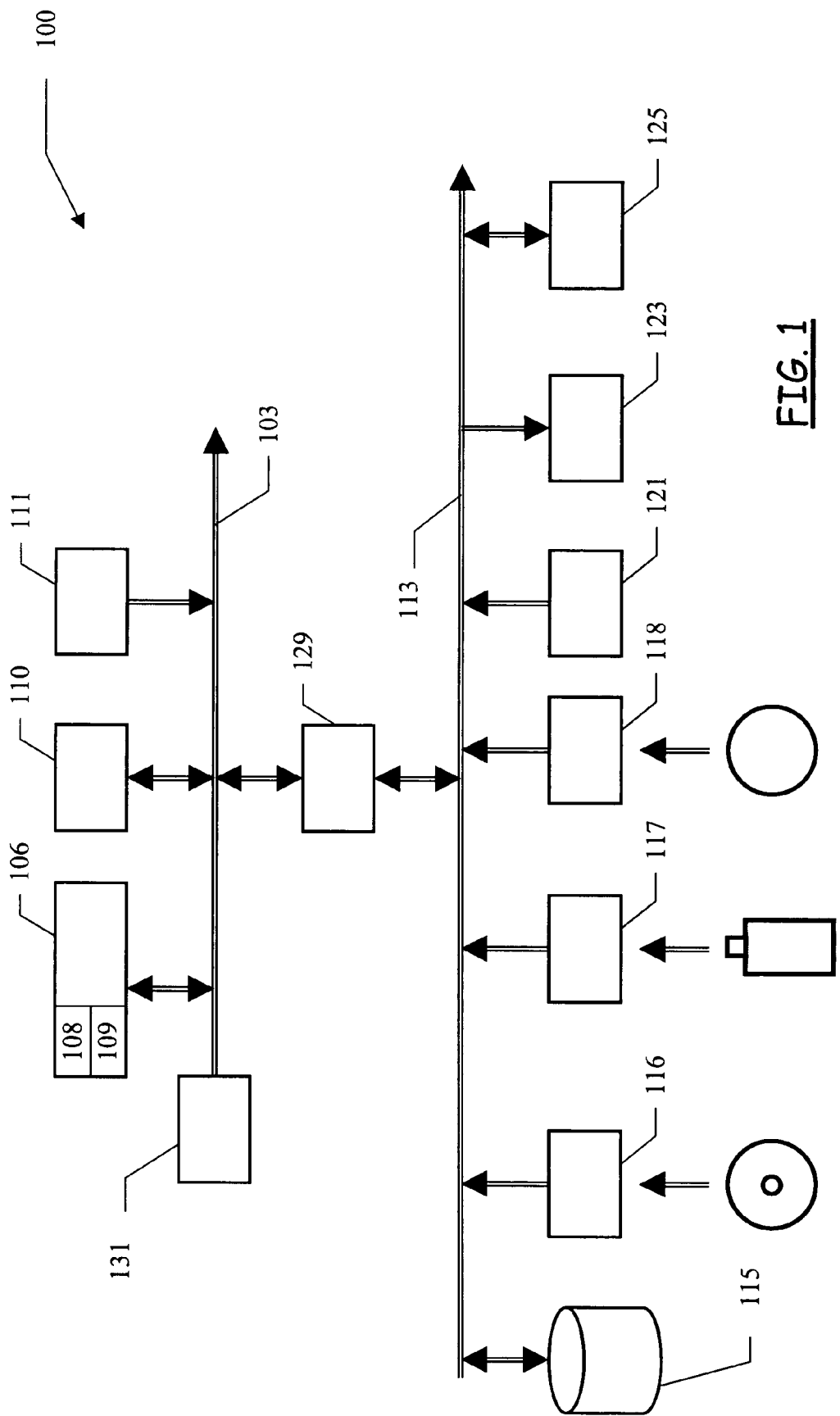
FIG. 1 is a functional block scheme of an example of a device on which the method according to an embodiment of the present invention can be implemented.

In FIG. 1 there is schematically shown, in terms of the main functional blocks, a data processing device 100 on which a method according to an embodiment of the present invention can be implemented.

The data processing device 100, for instance a Personal Computer (possibly a notebook, a laptop, a netbook, a palm-top) or a smart-phone, includes a plurality of units connected in parallel to a system bus 103.

One (or possibly more) processing units (μp) 106 connected to the system bus 103 controls the operation of the data processing device. An internal memory directly accessible by the data processing unit 106 is used as a working memory; particularly, the internal memory can include one or more (possibly all) of the following units: a set of memory registers 108 and a cache memory 109—for instance a multilevel hierarchical cache memory—directly located in the data processing unit 106 and a main memory 110—for instance comprising a set of random access memory banks—RAM—interfaced to the data processing unit 106 through the system bus 103. The system bus 103 is also connected to a read-only memory (ROM) 111 adapted to store the basic code for the start-up of the data processing device.

Peripheral units are connected (through respective interfaces) to a local bus 113. Particularly, an external memory not directly accessible by the data processing unit 106 is used as mass-storage memory; the external memory can include one or more (possibly all) of the following units: one or more hard disks 115, CD-ROM/DVD-ROM drivers 116, semiconductor memory devices 117, removable or not (like of USB flash memory readers), and magnetic tape units 118.

The data processing device 100 further comprises data input devices 121, for instance a keyboard and a mouse, and output devices 123, for instance a display (monitor) and a printer.

A network interface card 125 is used for connecting the data processing device to a data network, for instance an Ethernet. Alternatively or additionally, a modem can be foreseen, for instance of the ADSL type.

A bridge unit 129 interfaces the system bus 103 to the local bus 113, an arbiter unit 131 managing the access to the system bus 103 in case there is more than one data processing unit 106.

It will be clear to those skilled in the art that, depending on the specific data processing device and on its respective functionalities, the represented structure can be scaled down or up. For instance, in addition to the data processing unit 106, a graphic accelerator can be foreseen, equipped of a GPU.

In the detailed description that follows, reference will be made, purely by way of example, to a vectorial graphic engine according to the SVG standard of W3C; nevertheless, the solution according to the present invention is not to be intended as limited to the use with such engine.

Figure 2:
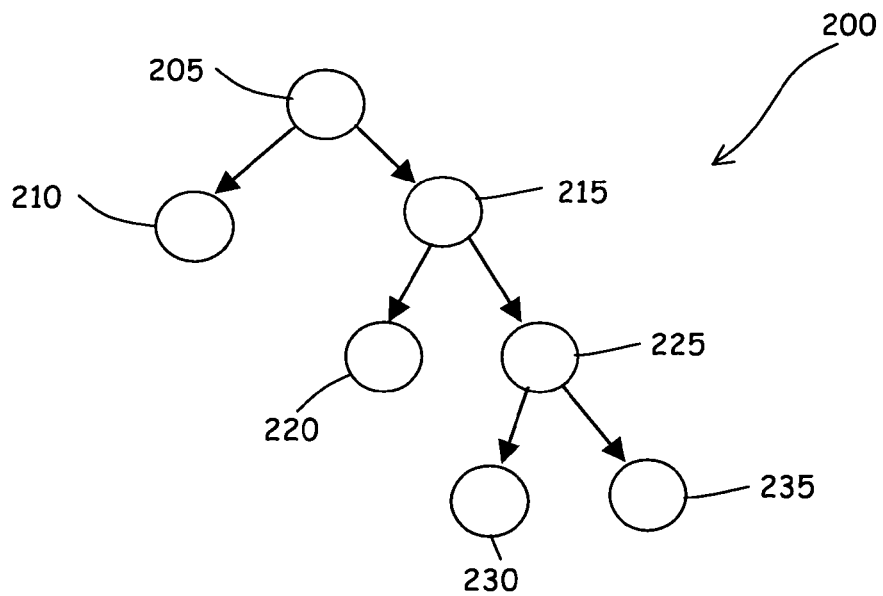
FIG. 2 shows an example of tree structure describing a graphic scene to be displayed.

As known and mentioned in the foregoing, a vectorial graphic engine receives and operates on a description, in terms of the XML language, of a scene to be drawn and for instance to be displayed on a screen, or to be printed onto a support of paper or other material; the description of the scene is composed by a hierarchy of nodes (father nodes and children nodes) represented through an inheritance tree. In FIG. 2 there is shown an example of description of a graphic scene to be displayed in the form of an inheritance tree 200. The tree 200 includes a root node 205. Below the root node 205 there are two children nodes 210 and 215: the node 210 is a node to which there corresponds a graphic representation of an element of the scene to be displayed, i.e. a node to which one or more vectorial graphic primitives correspond, while the node 215 is a container node, i.e. a node to which no graphic representation corresponds, being on the contrary only the container of other nodes, in the example other two nodes 220 and 225. The node 220 is a node having a graphic representation, while the node 225 is in turn a container node, containing in the example the two nodes 230 and 235, both having graphic representation.

According to the present invention, for the calculation of the bounding box of a given graphic element of the scene, corresponding to a determined node (basic node) of the tree structure that represents the same scene, for example the node 215 of the tree structure 200 in FIG. 2, a recursive procedure is performed on the children nodes of the given basic node, in the example herein consider the children nodes 220 and 225; for each child node 220 and 225 of the base node 215, the respective bounding box is calculated and accumulated. In other words, the tree that represents the graphic scene is run through starting from the selected base node and scanning the list of the children nodes of the considered node, and for each node at a lower hierarchical level with respect to the base node, the respective bounding box is calculated and accumulated. In the considered example, starting from the base node 215, the tree 200 is run through and the child node 220 is encountered, which is a node having a graphic representation: the bounding box of the shape described by the graphic primitive(s) contained in the node 220 is calculated, and the thus calculated bounding box is accumulated (it is for instance stored in the working memory of the computer). The procedure then returns to the base node 215 and descends to the child node 225; since this is a container node, the exploration of the tree 200 continues, reaching the child node 230, which corresponds to a displayable graphic shape: the respective bounding box is calculated and accumulated to the bounding box already stored in the memory (the accumulation corresponding to an operation of union of the bounding box just calculated with that calculated previously and stored in the memory). Then the procedure returns again to the node 225 and descends along the tree to encounter the child node 235, also corresponding to a displayable graphic shape; the bounding box is calculated and accumulated. Having thus completed the exploration of the portion of tree 200 below the base node 215, the accumulated bounding box stored in the memory corresponds to the bounding box of the graphic shape described by the base node 215 and by the nodes below it.

The recursive procedure just described can be for instance expressed in pseudocode in the following way:

```
CalculateBBox (AccumulatedBBox, Node)
{
    For All the children of Node
    {
        CalculateBBox (AccumulatedBBox, Node)
    }
    If (Node is a Primitive)
    {
        Node.CalculateBBoxOnPrimitive (TemporaryBBox)
        Accumulated BBox = union (AccumulatedBBox,
        TemporaryBBox)
    }
}
```

The function CalculateBBox described in pseudocode manages therefore the calculation of the bounding box on the individual node of the tree calling itself to perform the calculation of the bounding box on the children nodes of such node. When the function CalculateBBox is invoked, the identifier Node of the base node of the tree on which to operate is passed to the function, i.e. the identifier of the node for which it is desired to calculate the bounding box (in the example, the starting node is the node 215, and at every recursive call of the function CalculateBBox the identifier of a node at a hierarchically lower level is passed to the function); the function CalculateBBox provides in output as a result the bounding box calculated by accumulation AccumulatedBBox.

During the recursive procedure, for each node that is not a container node, i.e. for each node which corresponds to a drawable graphic primitive, like for instance the nodes 220, 230 and 235 in FIG. 2, if such drawable primitive is a composed or complex primitive, it is decomposed into an ordered list of base primitives or elementary primitives; the order by which the list of the base primitives is sorted corresponds to the order by which the base primitives are drawn for composing the overall primitive. For example, a rectangle with rounded edges is decomposed into 8 base primitives (4 lines, corresponding to the sides of the rectangle, and 4 arcs of circle of ¼ of round angle, corresponding to the roundings at the vertexes of the rectangle) with the property of being a closed list.

The bounding box resulting from the accumulation by union of two bounding boxes (the function union in the above pseudocode) is represented by the smallest rectangle that contains them both; the resultant bounding box is obtainable by selecting, from the two rectangles corresponding to the two bounding boxes to be united, the minimum and maximum coordinates along the two axes of the system of coordinates taken as a reference.

The base primitives considered for simplicity in the following are segments and cubic Bezier curves: by means of these base primitives it is in fact possible to express or approximate with suitable precision any complex primitive, also concave. Particularly, by means of base primitives describing segments it is possible to express sections of straight line, polygons, broken lines, and, using the properties defining the thickness of the segments, rectangles and squares; using the cubic Bezier curves it is in particular possible to approximate circles and ellipsis. On the list of the base primitives that compose the complex primitive the bounding box is calculated by iterating on the individual base primitives and accumulating by union the different bounding boxes calculated for the different base primitives.

The calculation of the bounding box for the base primitives depends on the type of considered base primitive.

Figure 3:
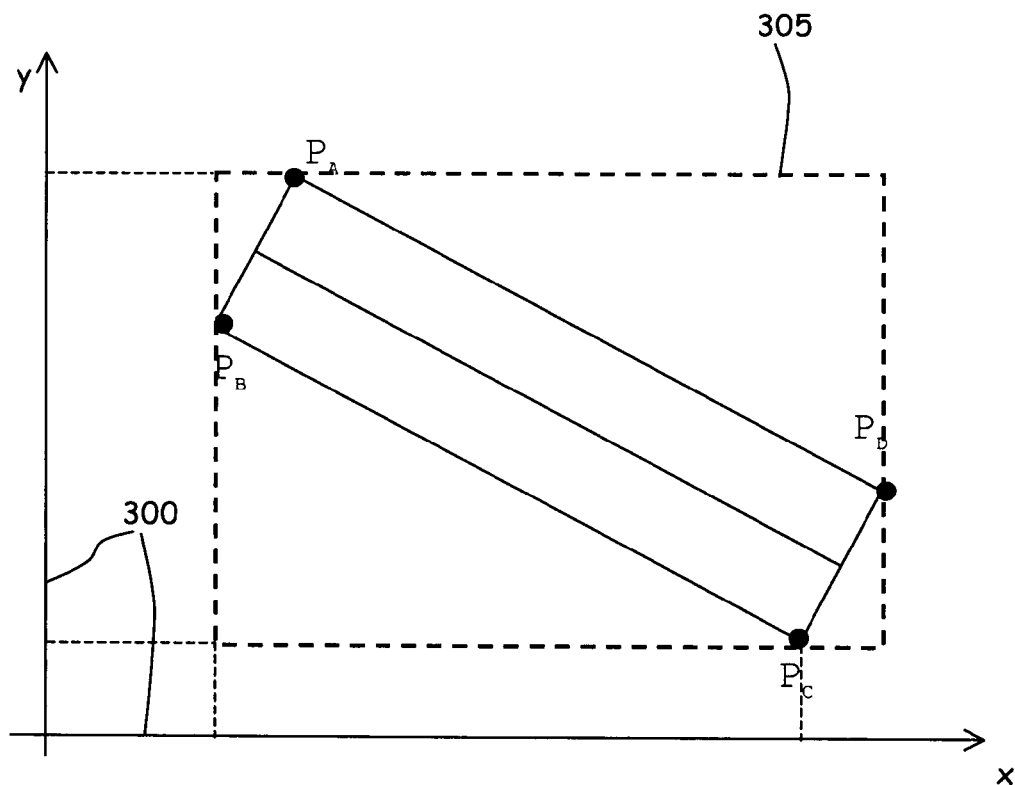
FIG. 3 exemplifies the calculation of the bounding box for a base vectorial graphic primitive corresponding to a rectangle.

If the base primitive is a segment, possibly also having thickness (so as to define a rectangle), as shown in FIG. 3, for the calculation of the bounding box 305 the coordinates ($x_A$, $y_A$), ($x_B$,$y_B$), ($x_C$,$y_C$), ($x_D$,$y_D$) of the points $P_A$, $P_B$, $P_C$ and $P_D$ (in a determined reference system of coordinates 300) are used. The bounding box is therefore the rectangle having a first side 305a given by a vertical segment (parallel to the axis y of the system of coordinates 300) of a straight line x=min ($x_A$, $x_B$, $x_C$, $x_D$), a second side 305b given by a vertical segment of a straight line x=max ($x_A$, $x_B$, $x_C$, $x_D$), a third side given by a horizontal segment (parallel to the axis x of the system of coordinates 300) of a straight line y=min ($y_A$, $y_B$, $y_C$, $y_D$), and a fourth side given by a horizontal segment of a straight line y=max ($y_A$, $y_B$, $y_C$, $y_D$).

If the base primitive is the cubic Bezier curve, it is analytically expressed by the following equation:

$$B(t) = P_0*(1-t)^3 + 3*P_1*t*(1-t)^2 + 3*P_2*t^2*(1-t) + P_3*t^3$$

$$t \in [0,1]$$

where t is a parameter that defines a curvilinear coordinate.

The calculation of the bounding box for this curve is possible by determining the points of horizontal and vertical tangency thereto. Starting from the above equation, it is possible to calculate the points of horizontal tangency $T_{horl}(x_1, y_1)$, $T_{horl}(x_2,y_3)$ and vertical tangency $T_{horl}(x_3,y_3)$, $T_{horl}(x_4, y_4)$ in the following way:

$$\begin{cases} x = t^3 * \overline{(x_3 - 3*x_2 + 3*x_1 - x_0)} + \\ t^2 * \overline{3*(x_0 - 2*x_1 + x_2)}^{b_x} + t * \overline{3*(x_1 - x_0)}^{c_x} + \overline{x_0}^{d_x} \\ y = t^3 * \overline{(y_3 - 3*y_2 + 3*y_1 - y_0)} + \\ t^2 * \overline{3*(y_0 - 2*y_1 + y_2)}^{b_y} + t * \overline{3*(y_1 - y_0)}^{c_y} + \overline{y_0}^{d_y} \end{cases}$$

$$\frac{dy}{dx} = \frac{3*a_y*t^2 + 2*b_y*t + c_y}{3*a_x*t^2 + 2*b_x*t + c_x}$$

$$\begin{cases} T_{horl,2} = \frac{-2*b_y \pm \sqrt{4*b_y^2 - 12*a_y*c_y}}{6*a_y} \Big| a_y \neq 0 \\ T_{horl,2} = \frac{-c_y}{2*b_y} \Big| a_y = 0 \end{cases}$$

-continued $$\begin{cases} T_{vert3,4} = \dfrac{-2*b_x \pm \sqrt{4*b_x^2 - 12*a_x*c_x}}{6*a_x} \Big| a_x \neq 0 \\ T_{vert3,4} = \dfrac{-c_x}{2*b_x} \Big| a_x = 0 \end{cases}$$

The points of tangency may or not belong to the curve itself. The cubic Bezier curve is in fact defined only for the following values of the parameter t: $0 \leq t \leq 1$.

The points of horizontal and vertical tangency will affect the calculation of the bounding box in the case in which the values of the parameter t, such that the tangents to the curve are horizontal and vertical, lie on the curve; if this is not the case, in the determination of the bounding box only the extremes of the curve will be used. Thus, for the calculation of the bounding box the following points are used:

horizontal tangency (if such point is valid, i.e. if it lies on the curve);

vertical tangency (if said point is valid);

the extremes of the Bezier curve.

The bounding box will be defined by the minimum and maximum coordinates among the coordinates of the points described above.

Let a Bezier curve being considered for which a thickness has not been defined and on which no transformation has been applied. This curve is defined as a curve of ideal thickness, that is, a curve that is drawn with a unitary thickness. When to the curve of ideal thickness the properties of thickness, termination and junction are applied, the curve is defined as "decorated".

Figure 4:
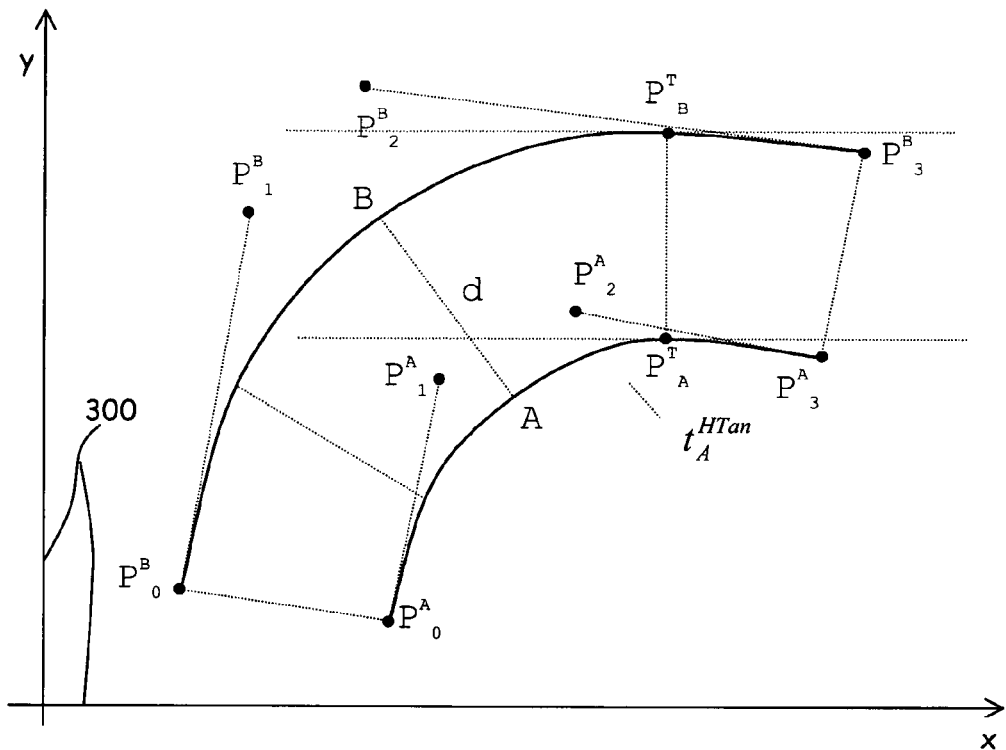
FIG. 4 shows a cubic Bezier curve with thickness.

Let the case of a curve with thickness be considered. In FIG. 4 a cubic Bezier curve A of ideal thickness is represented, together with its external edge, constituted by a cubic Bezier curve B at a distance d from the curve A.

Given a cubic Bezier curve like the curve A of FIG. 4, the calculation of the equation (that is, the determination of the control points) of the cubic Bezier curve B distant a distance d from the curve A is a problem that cannot be solved analytically.

Since nevertheless the objective is that of calculating the bounding box of the shape defined by the two curves A and B, the problem can be simplified by determining the points of horizontal and vertical tangency on the curve B. Since the curve B is defined as the curve distant d from the curve A for every value of the parameter t, the point, for instance, of horizontal tangency $P^T_B$ on the curve B can be determined as the point distant d from the point of horizontal tangency $P^T_A$ on the curve A. The calculation of the bounding box can thus proceed using the points of horizontal and vertical tangency of the curve A (or the extreme points of the curve A, if the values of the parameter t for which there is vertical or horizontal tangency do not lie on the curve A) and by calculating the points of horizontal and vertical tangency on the curve B ($P^T_B$) moving the distance d along the perpendicular to the curve A in such points of tangency or extreme, in the following way.

Figure 5:
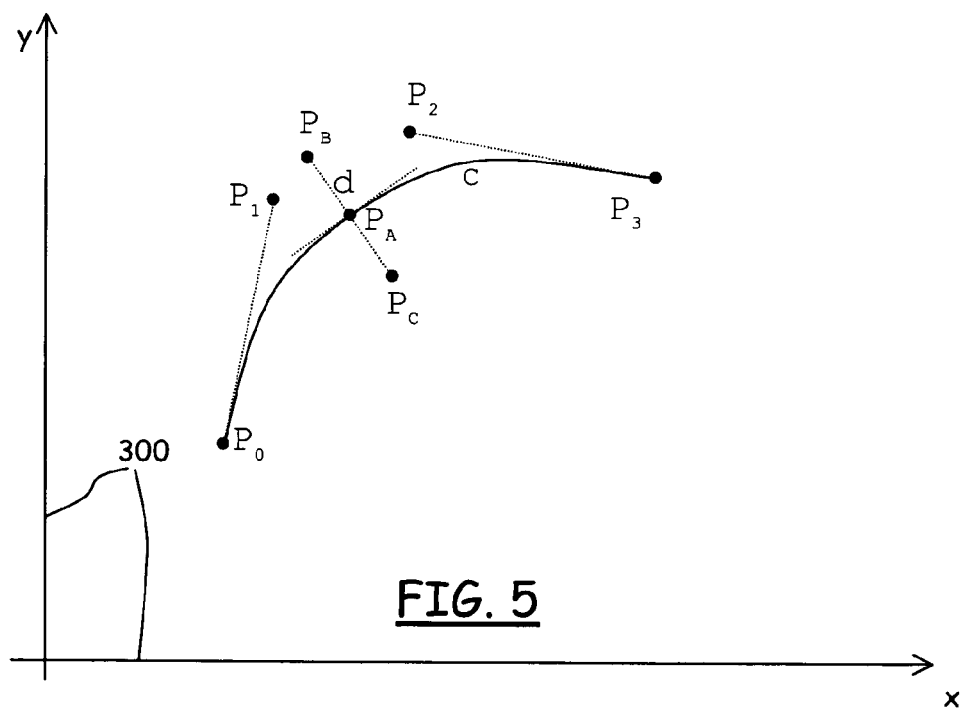
FIG. 5 shows an ideal cubic Bezier curve (without thickness)

With reference to FIG. 5, let $P_0$, $P_1$, $P_2$ and $P_3$ be the control points of a cubic Bezier curve C; the points $P_B$ and $P_C$ distant d from the point $P_A$ and lying on the perpendicular to the tangent to the curve in the point $P_A$ are determined in the following way. Given:

$$D_A = \dfrac{dy}{dx}\Big|_{t_A}$$

$$D'_A = -\dfrac{1}{D_A}$$

the straight line $P_A$-$P_B$ has equation:

$$y = D'_A * x + y_A - D'_A * x_A$$

The distance between two generic points $P_1$ $(x_1, y_1)$ and $P_2$ $(x_2, y_2)$ along a straight line is given by:

$$\text{Distance } (P_1 - P_2) = |x_1 - x_2| * \sqrt{1 + \alpha^2}$$

so, for obtaining the coordinates of the point $P_B$ shown in FIG. 5 it is necessary to solve the following equations:

$$\begin{cases} x_B = x_A \pm \dfrac{d}{\sqrt{1 + D'^2_A}} \\ y_B = y_A \pm D'_A * |x_B - x_A| \end{cases}$$

The solutions of the equations correspond to two points (the two points $P_B$ and $P_C$ of FIG. 5). In order to determine which of the two points that satisfy the equation is located on the left and on the right with respect to the sense in which the curve is run along (values of t increasing) it is:

| $\dfrac{dy}{dt}\Big|_{t_A}$ | $\dfrac{dx}{dt}\Big|_{t_A}$ | | |
|---|---|---|---|
| | >0 | =0 | <0 |
| >0 | − | $x_B = x_A - d$ | + |
| =0 | $y_B = y_A - d$ | impossible | $y_B = y_A + d$ |
| <0 | + | $x_B = x_A + d$ | − |

If the thick edge of the cubic Bezier curve is subject to affine transformation, the position of the points of horizontal and vertical tangency varies depending on the parameters of the transformation.

Figure 6C:
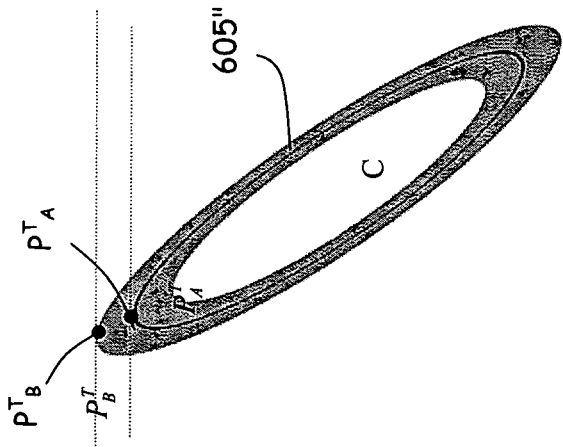
FIGS. 6A, 6B and 6C show the affine transformation of an ellipse with thickness (approximated by four arcs of cubic Bezier curve)
Figure 6B:
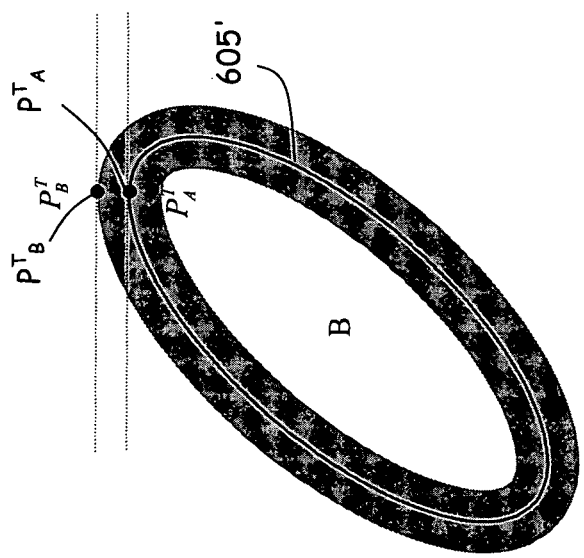
Figure 6A:
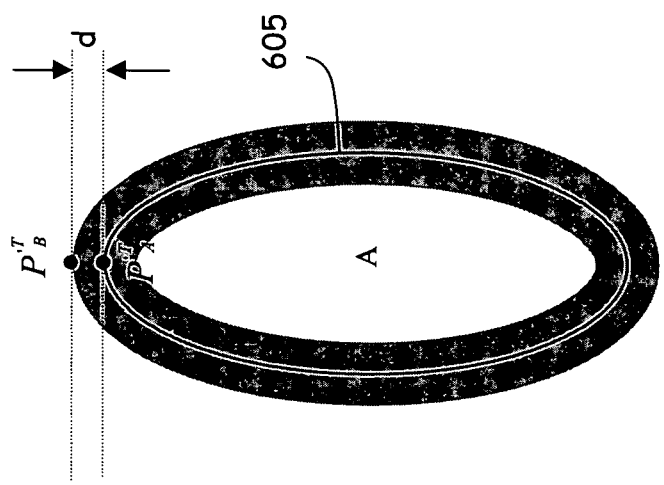

In FIGS. 6A-6C there are shown three cases of affine transformation of a curve with thickness composed by 4 arcs of Bezier curves, approximating an ellipse: identity, that is the curve before the application of the transformation (FIG. 6A), rotation (FIG. 6B) and skew (FIG. 6C); the curve of ideal thickness before and after the transformation is denoted with 605, 605' and 605"; the shaded area around the curve 605, 605' and 605" represents the thickness of the curve. In these cases, the operations to be performed for determining the points of horizontal and vertical tangency are the following.

1. The point of tangency, for instance the point of horizontal tangency $P^T_A$, is identified on the curve of ideal thickness 605' or 605" obtained after the transformation of the curve of ideal thickness 605.

2. The value $t_A^{HTan}$ of the parameter t is determined for which there is tangency (for instance, horizontal tangency).

3. The coordinates of the point on the curve 605 corresponding to the value $t = t_A^{HTan}$ before the transformation ($P'^T_A$) are calculated.

4. The point $P'^T{}_B$ is calculated which is located at a distance d from the point $P'^T{}_A$ on the curve 605 in orthogonal direction to the tangent (horizontal tangent, in this case).

5. By applying the transformation, the point $P'^T{}_B$ is transformed to obtain the point $P^T{}_B$.

For the correct calculation of the bounding box of the curve described by the individual base primitive, also the specific mode of junction and/or the mode of termination of the curve should be kept into account.

Figure 7:
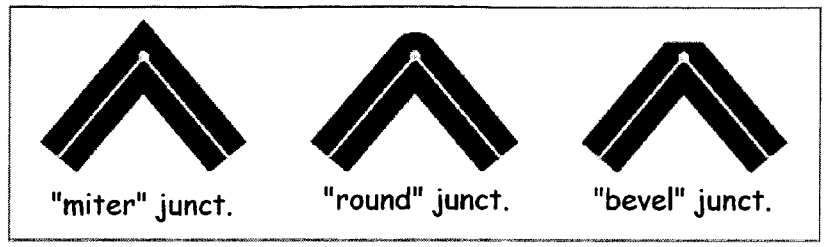
FIG. 7 shows three typical modes of junction between two base primitive curves.
Figure 8:
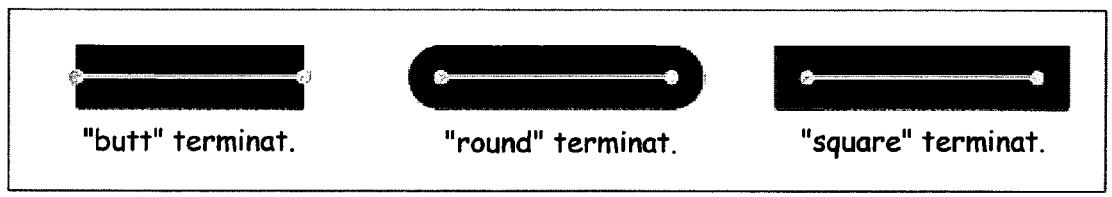
FIG. 8 shows three typical modes of termination of a base primitive curve.

The junction modes are typically three: miter junction, bevel junction and round junction, as shown in FIG. 7. In turn, the modes of termination are typically the butt termination, the square termination and the round termination, as shown in FIG. 8.

In order to consider, in the calculation of the bounding box, the junction mode of the base primitives that compose a complex primitive, at each iteration on a base primitive the parameters are used that describe the terminal part of the preceding base primitive (in the order in which the complex primitive is drawn) and the parameters are used that describe the initial part of the next base primitive. For the calculation of the junction at the initial point of the base primitive it is in fact necessary to know the tangent and the incoming direction of the preceding base primitive. For the calculation of the junction at the final point of the base primitive it is necessary to calculate the tangent and the exiting direction of the next base primitive. Account is further taken of the fact that the complex primitive may or may not be a closed curve: in the case it is not closed, some of the junctions become terminations of the complex primitive. It is underlined that the information of junction and termination is significant only if the bounding box is to be calculated in respect of a decorated curve.

Figure 9:
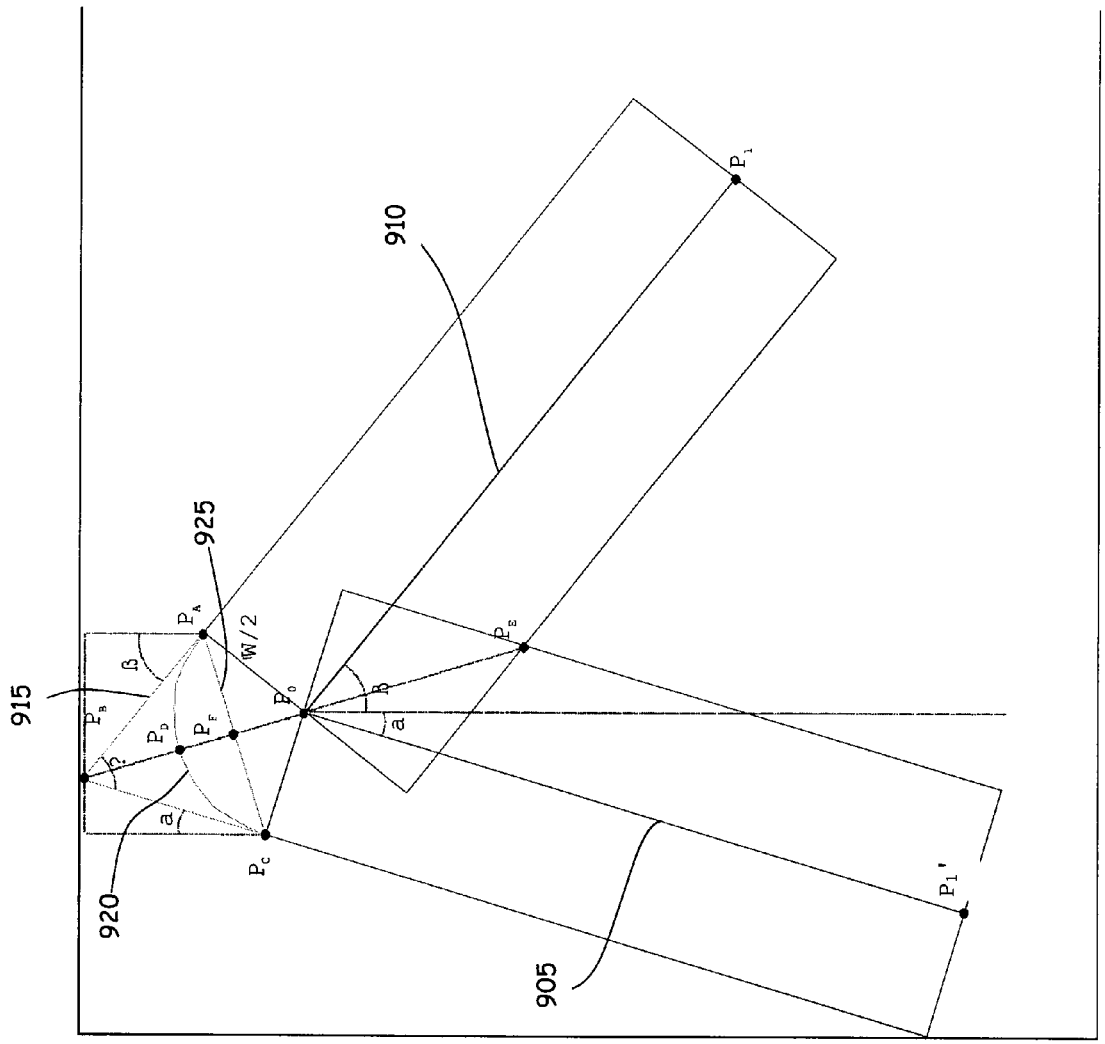
FIG. 9 shows the procedure for the calculation of the bounding box keeping into account the specific mode of junction between two base primitives.

In FIG. 9 there are shown from the geometric viewpoint the various cases of junction between two cubic Bezier curves (not shown) with non-ideal thickness; in the figure, the points $P_0$ and $P'_1$ are respectively the terminal point and the second control point of the incoming cubic Bezier curve; the points $P_0$ and $P_1$ are respectively the initial point and the first control point of the outgoing cubic Bezier curve. The segments 905 and 910 represent the tangents to the respective arcs of curve in the terminal points thereof: the tangent ($P_0$-$P'_1$) to the incoming curve in the terminal point P and the tangent $P_0$-$P_1$ to the outgoing curve. The curve 915 that passes for the point $P_B$ corresponds to the miter junction case; the curve 920 that passes for the point $P_D$ corresponds to the case of round junction; the curve 925 that passes for the point $P_F$ corresponds to the case of bevel junction. In the case of junction between two curves, the final point of the incoming curve and the initial point of the outgoing curve coincide. The two tangents are represented with their thickness $P_A$-$P_0$=$P_0$-$P_C$=W/2, where W is the thickness of the contour of the primitive.

In order to consider the junctions between the base primitives that compose a complex primitive, in the calculation of the bounding box also the curves corresponding to the used junction are inserted, according to the type of junction:

1. In the case of the miter junction type, the two segments $P_C$-$P_B$ and $P_A$-$P_B$. An exception is represented by the case in which the length of the miter junction is greater than the limit (MiterLimit) imposed by the author of the scene.

$P_B$-$P_0$*sin(θ/2)=W/2=half the length of the miter junction

If the length of the miter junction is greater than MiterLimit, the miter junction collapses to a bevel junction.

2. In the case of a round junction, the arc of circle that passes for $P_C$-$P_D$-$P_A$ 3. in the case of bevel junction, the segment $P_C$-$P_F$-$P_A$.

Figure 10:
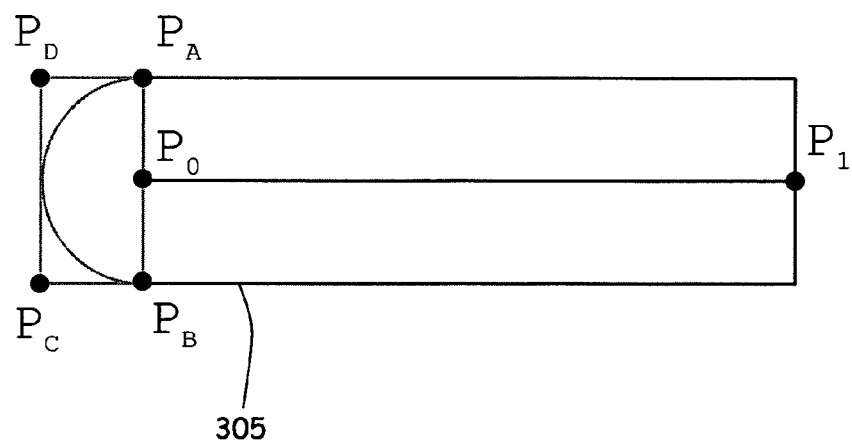
FIG. 10 shows the procedure for the calculation of the bounding box keeping into account the specific mode of termination of a base primitive.

In the case in which the list of base primitives that compose the complex primitive is not closed, two junctions are transformed into terminations. In this case, in the calculation of the bounding box also the curve corresponding to the established termination is inserted. With reference to FIG. 10, in the case of a butt termination, the curve corresponding to the termination is the segment $P_A$-$P_B$; in the case of a square termination, it is the rectangle having as vertexes the points $P_A$, $P_B$, $P_D$ and $P_C$; in the case of a round termination, it is the arc of circle that connects the points $P_A$ and $P_D$.

The general procedure of calculation of the bounding box of a complex primitive can be described by the following pseudocode:

```
Node::CalculateBBoxOnPrimitive(BBox)
{
    It generates a list of BasePrimitives depending on the node
    For each base primitive
    {
        Transform the base primitive according to the affine
            transformation of the primitive
        If basePrimitive==Line
        {
            Calculate the 2 points P_A and P_B at a distance
    equa to width/2 from P_0 in the orthogonal direction to the
    tangent in P_0
            Accumulate the two points in BBox
        }
        Else
        {
            Calculate points and t of horizontal and vertical
tangency of cubic Bezier
            Calculate points at a distance width/2 from the
points of tangency non transformed
            Transform the latter
            Accumulate them in BBox
        }
        Management of terminations depending on the type of
termination and on the closure of the BasePrimitive
        Management of junctions depending on the type of junction
    and on the closure of the BasePrimitive
    }
}
```

Although in the preceding description only two base primitives, i.e. the primitive segment and the primitive cubic Bezier curve, have been considered for the sake of simplicity, the technique of analytical calculation of the bounding box is not limited to such shapes, and it can be for instance applied also to the calculation of the bounding box of base primitives representing the circle and the ellipse (possibly decorated). Also in such case the bounding box will be calculated by determining the points of horizontal and vertical tangency to the curves. In the case of circles or ellipsis with non-unitary thickness, the calculation of the bounding box will still be based on the points of horizontal and vertical tangency to the curve that defines the external edge of the shape, and the determination of such points of tangency results simplified in comparison to the case of the decorated cubic Bezier curve, since for the circle and the ellipse the equations that analytically express the external edge are known (circle and, respectively ellipse distant d from the ideal curve). In the case of affine transformation, the same technique can be applied described in connection to the FIGS. 6A-6C.

The present invention has been here described making reference to some possible embodiments thereof. Those skilled in the art can clearly bring numerous variations to the described embodiments, as well as devise alternative embodiments, without however departing from the protection scope defined in the appended claims.

The invention claimed is:

1. A method comprising:
retrieving, by a processor, a description of a computerized graphic shape comprised of a plurality of vectorial primitives;
calculating, by the processor, a bounding box for each vectorial primitive in the plurality of vectorial primitives, said calculating comprising:
determining whether the vectorial primitive is a first type of vectorial primitive or a second type of vectorial primitive,
where the vectorial primitive is the first type, applying a first plurality of mathematical functions to the vectorial primitive, and
where the vectorial primitive is the second type, applying a second plurality of mathematical functions, different from the first plurality of mathematical functions, to the vectorial primitive;
determining a bounding box of the computerized graphic shape, said determining including combining the calculated bounding boxes by union; and
displaying of the computerized graphic shape through resolution of the plurality of vectorial primitives.

2. The method of claim 1, wherein the first type of vectorial primitive is a straight line segment and wherein the second type of vectorial primitive is a cubic Bezier curve.

3. The method of claim 2, in which the calculating of the bounding box of the first type of vectorial primitive includes determining, in a reference system of coordinates, minimum and maximum coordinates of vertexes of the straight line segment.

4. The method of claim 2, in which the calculating of the bounding box of the second type of vectorial primitive includes:
calculating a point of tangency to the cubic Bezier curve;
determining whether the point of tangency lies on the cubic Bezier curve;
if the point of tangency lies on the Bezier curve, representing coordinates, in a reference system of coordinates, of the point of tangency as coordinates of a side of the bounding box; and
if the point of tangency does not lie on the curve, representing as coordinates of a side of the bounding box coordinates of an extreme point of the cubic Bezier curve closer to the point of tangency.

5. The method of claim 2, in which the calculating of the bounding box of the second type of vectorial primitive includes:
determining the cubic Bezier curve has a thickness;
calculating a point of tangency to a cubic Bezier curve having no thickness,
determining a point located orthogonally from the cubic Bezier curve at the point of tangency and at a distance from the point of tangency corresponding to the thickness of the cubic Bezier curve; and
representing as coordinates of a side of the bounding box coordinates of the orthogonal point.

6. The method of claim 2, in which the calculating of the bounding box of the second type of vectorial primitive includes:
determining the cubic Bezier curve has a thickness and is subject to an affine transformation resulting in a post-transformation cubic Bezier curve;
determining a point of post-transformation tangency on the post-transformation cubic Bezier curve;
determining a value of a curvilinear coordinate of the post-transformation cubic Bezier curve, said value corresponding to the point of post-transformation tangency;
calculating a pre-transformation point on the cubic Bezier curve, said pre-transformation point also corresponding to the determined value; and
determining a perpendicular point located orthogonally from the cubic Bezier curve at the pre-transformation point, said perpendicular point being placed at a distance equal to the thickness.

7. The method according to claim 1, wherein calculating the bounding box for at least one vectorial primitive of the plurality of vectorial primitives comprises determining a junction mode between the at least one vectorial primitive and another vectorial primitive of the plurality of vectorial primitives.

8. The method according to claim 1, wherein calculating the bounding box for at least one vectorial primitive of the plurality of vectorial primitives comprises determining a termination mode of the at least one vectorial primitive.

9. A computer readable storage medium having computer code stored thereon that, when executed by a processor, cause the processor the processor to perform a method comprising the steps of:
retrieving a description of a computerized graphic shape comprising a plurality of vectorial primitives;
calculating a bounding box for each vectorial primitive in the plurality of vectorial primitives, said calculating comprising:
determining whether the vectorial primitive is a first type of vectorial primitive or a second type of vectorial primitive,
applying a first plurality of mathematical functions to the vectorial primitive where the vectorial primitive is the first type, and
applying a second plurality of mathematical functions, different from the first plurality of mathematical functions, to the vectorial primitive where the vectorial primitive is the second type;
determining a bounding box of the computerized graphic shape, said determining including combining the calculated bounding boxes by union; and
displaying of the computerized graphical shape through resolution of the vectorial primitives.

10. The computer readable storage medium of claim 9, wherein the first type of vectorial primitive is a straight line segment and wherein the second type of vectorial primitive is a cubic Bezier curve.

11. The computer readable storage medium according to claim 10, in which the calculating of the bounding box of the first type of vectorial primitive includes determining, in a reference system of coordinates, minimum and maximum coordinates of vertexes of the straight line segment.

12. The computer readable storage medium according to claim 10, in which the calculating of the bounding box of the second type of vectorial primitive includes:
calculating a point of tangency to the cubic Bezier curve;
if the point of tangency lies on the curve, representing coordinates, in a reference system of coordinates, of the point of tangency as coordinates of a side of the bounding box; and if the point of tangency does not lie on the curve, representing as coordinates of a side of the bounding box coordinates of an extreme point of the cubic Bezier curve closer to the point of tangency.

13. The computer readable storage medium according to claim 11, wherein calculating the bounding box of the second type of vectorial primitive includes:
    determining the cubic Bezier curve has a thickness;
    calculating a point of tangency to a cubic Bezier curve having no thickness,
    determining a point located orthogonally from the cubic Bezier curve at the point of tangency and at a distance from the point of tangency corresponding to the thickness of the curve; and
    representing as coordinates of a side of the bounding box the coordinates of the orthogonal point.

14. The computer readable storage medium according to claim 11, in which the calculating of the bounding box of the second type of vectorial primitive includes:
    determining the cubic Bezier curve has a thickness and is subject to an affine transformation resulting in a post-transformation cubic Bezier curve;
    determining a point of post-transformation tangency on the post-transformation cubic Bezier curve;
    determining a value of a curvilinear coordinate of the post-transformation cubic Bezier curve, said value corresponding to point of post-transformation tangency;
    calculating a pre-transformation point on the cubic Bezier curve said pre-transformation point also corresponding to the determined value; and
    determining a perpendicular point located orthogonally from the cubic Bezier curve at the pre-transformation point, said perpendicular point being placed at a distance equal to the thickness.

15. The computer readable storage medium according to claim 9, wherein calculating the bounding box for at least one vectorial primitive of the plurality of vectorial primitives comprises determining a junction mode between the at least one vectorial primitive and another vectorial primitive of the plurality of vectorial primitives.

16. The computer readable storage medium according to claim 11, wherein calculating the bounding box for at least one vectorial primitive of the plurality of vectorial primitives comprises determining a termination mode of the at least one vectorial primitive.

17. A data processing system comprising:
    a processing unit;
    a memory having computer code stored thereon that, when executed by the processing unit, cause the processing unit to perform steps of:
        retrieving a description of a computerized graphic shape comprising a plurality of vectorial primitives;
        calculating a bounding box for each vectorial primitive in the plurality of vectorial primitives, said calculating comprising:
            determining whether the vectorial primitive is a first type of vectorial primitive or a second type of vectorial primitive,
            applying a first plurality of mathematical functions to the vectorial primitive where the vectorial primitive is the first type, and
            applying a second plurality of mathematical functions, different from the first plurality of mathematical functions, to the vectorial primitive where the vectorial primitive is the second type;
        determining a bounding box of the computerized graphic shape, said determining including combining the calculated bounding boxes by union; and
        displaying of the computerized graphical shape through resolution of the plurality of vectorial primitives.

18. The method of claim 1, wherein at least one vectorial primitive is arranged in the description as a child of a parent vectorial primitive, and wherein calculating the bounding box for the parent vectorial primitive includes calculating the bounding box for the at least one child vectorial primitive.

19. The method of claim 6, in which the calculating of the bounding box of the second type of vectorial primitive includes:
    applying the affine transformation to the determined perpendicular point.

20. The computer readable storage medium of claim 9, wherein at least one vectorial primitive is arranged in the description as a child of a parent vectorial primitive, and wherein calculating the bounding box for the parent vectorial primitive includes calculating the bounding box for the at least one child vectorial primitive.

21. The computer readable storage medium of claim 14, in which the calculating of the bounding box of the second type of vectorial primitive includes:
    applying the affine transformation to the determined perpendicular point.

* * * * *